United States Patent
Calippe et al.

(10) Patent No.: US 8,983,476 B2
(45) Date of Patent: Mar. 17, 2015

(54) METHOD AND APPARATUS FOR DYNAMICALLY ALLOCATING PHYSICAL CELL IDENTIFIERS

(75) Inventors: Joël R. Calippe, San Jose, CA (US); Gurudas Somadder, San Jose, CA (US); Murali K. Velamati, Mountain View, CA (US); Ashok Sadasivan, Sunnyvale, CA (US); Sergio Colla, San Jose, CA (US); Paula N. Balus, Cupertino, CA (US)

(73) Assignee: Alcatel Lucent, Boulogne-Billancourt (FR)

( * ) Notice: Subject to any disclaimer, the term of this patent is extended or adjusted under 35 U.S.C. 154(b) by 514 days.

(21) Appl. No.: 13/338,923

(22) Filed: Dec. 28, 2011

(65) Prior Publication Data

US 2013/0172031 A1    Jul. 4, 2013

(51) Int. Cl.
 *H04W 40/00*    (2009.01)

(52) U.S. Cl.
 USPC .......................... 455/446; 370/328

(58) Field of Classification Search
 USPC .......................... 455/446; 370/328
 See application file for complete search history.

(56) References Cited

U.S. PATENT DOCUMENTS 8,265,028 B2 * 9/2012 Davies et al. ................. 370/329

* cited by examiner

*Primary Examiner* — Raymond Dean
(74) *Attorney, Agent, or Firm* — Wall & Tong, LLP

(57) ABSTRACT

A method, system and apparatus for allocating a finite number of identifiers to a plurality of base stations in a wireless network and for iteratively processing respective ranges of identifiers to adapt identifier assignments in response to detected collision/confusion conditions.

22 Claims, 3 Drawing Sheets

METHOD AND APPARATUS FOR DYNAMICALLY ALLOCATING PHYSICAL CELL IDENTIFIERS

FIELD OF THE INVENTION

The invention relates generally to managing network resources and, more specifically but not exclusively, adapting operations associated with a base station in a wireless network, such as an eNodeB.

BACKGROUND

Within a mobile network, such as a 3G or 4G wireless network, physical cell identifiers (PCIs) must be allocated to base stations in a manner avoiding collision conditions (e.g., same identifier used by adjacent cell base stations) and/or confusion conditions (e.g., same identifier used by base stations within "n" cells of each other, such as adjacent to an adjacent cell). A collision condition occurs when, illustratively, two adjacent base stations (e.g., an adjacency of "1" wherein base stations supporting adjacent cellular regions) have been assigned the same identifier. The confusion condition occurs when, illustratively, two base stations sharing a common adjacent region have been assigned the same identifier (e.g., an adjacency of "2" wherein base stations supporting nonadjacent cellular regions share a common adjacent cellular regions).

With fixed location base stations such as spread out over a state or country, the appropriate allocations may be determined by calculation. However, within the context of very dense wireless networks, such as temporary installations at trade shows or other high user events, the allocation of PCIs is relatively difficult and the validation of such allocations is problematic using existing techniques. Currently, there are two techniques used to allocate identifiers:

(1) Systems engineers perform complex calculations and allocate PCIs a priori. Unfortunately, any errors or omissions by system engineers require additional calculations. Furthermore, the allocation of identifiers provided by the systems engineers must be validated in operation. All of this takes too much time.

(2) Identifiers are assigned on an ad hoc basis as a system grows. This may or may not work in terms of efficient allocation of identifiers. Moreover, depending upon the type and direction of organic growth associated with a system, different identifiers assigned during that growth may in retrospect prove to have been inefficiently or unwisely selected.

Both of the above techniques break down in certain conditions, such as the need for a temporary need to support many users as in the case of a trade show or other event likely to draw a large number of wireless device users. For example, it is critically important to divide sufficient wireless infrastructure in and around a facility hosting a tradeshow or other event such that a very large number of users may communicate using voice and data applications. In setting up such a temporary network, it is preferable to avoid the lengthy calculations associated with the first technique and the hit or miss approach associated with the second technique.

SUMMARY

Various deficiencies in the prior art are addressed by a method, system and apparatus for allocating a finite number of identifiers to a plurality of base stations in a wireless network and for iteratively processing respective ranges of identifiers to adapt identifier assignments in response to detected collision/confusion conditions.

One embodiment comprises a method for allocating a finite number of identifiers to a plurality of base stations in a wireless network, comprising: assigning, to each base station, a respective initial range of identifiers from said finite number of identifiers; and until a number of assigned identifiers associated with either of a collision condition or a confusion condition is below a threshold level, iteratively performing the steps of: (a) replacing at least some assigned identifiers associated with either of said collision or confusion conditions with unused identifiers, each replaced identifier being added to a pool of unused identifiers; and (b) determining, for each assigned identifier at each base station, whether the assigned identifier is associated with either of said collision condition or confusion condition. The step of sequentially assigning initial ranges of identifiers may be performed by a management system (MS) in communication with the base stations.

BRIEF DESCRIPTION OF THE DRAWINGS

The teachings of the present invention can be readily understood by considering the following detailed description in conjunction with the accompanying drawings, in which.

DETAILED DESCRIPTION OF THE INVENTION

The invention will be primarily described within the context of a Long Term Evolution (LTE) network in which Service Gateway (SGW) redundancy such that both active and idle subscribers are transitioned from a failed SGW to a backup SGW.

Although primarily depicted and described herein within the context of providing physical cell identifiers (PCI) allocation and management functions within a 4G LTE wireless network, it will be appreciated that the PCI allocation and management functions depicted and described herein may be utilized for other types of wireless networks, such as 3G networks, 2G networks, WiMAX and the like. Thus, the various network elements, links and other functional entities described herein with respect to an LTE network may be broadly construed to identify corresponding network elements, links and other functional entities associated with various other types of wireless networks.

Figure 1:
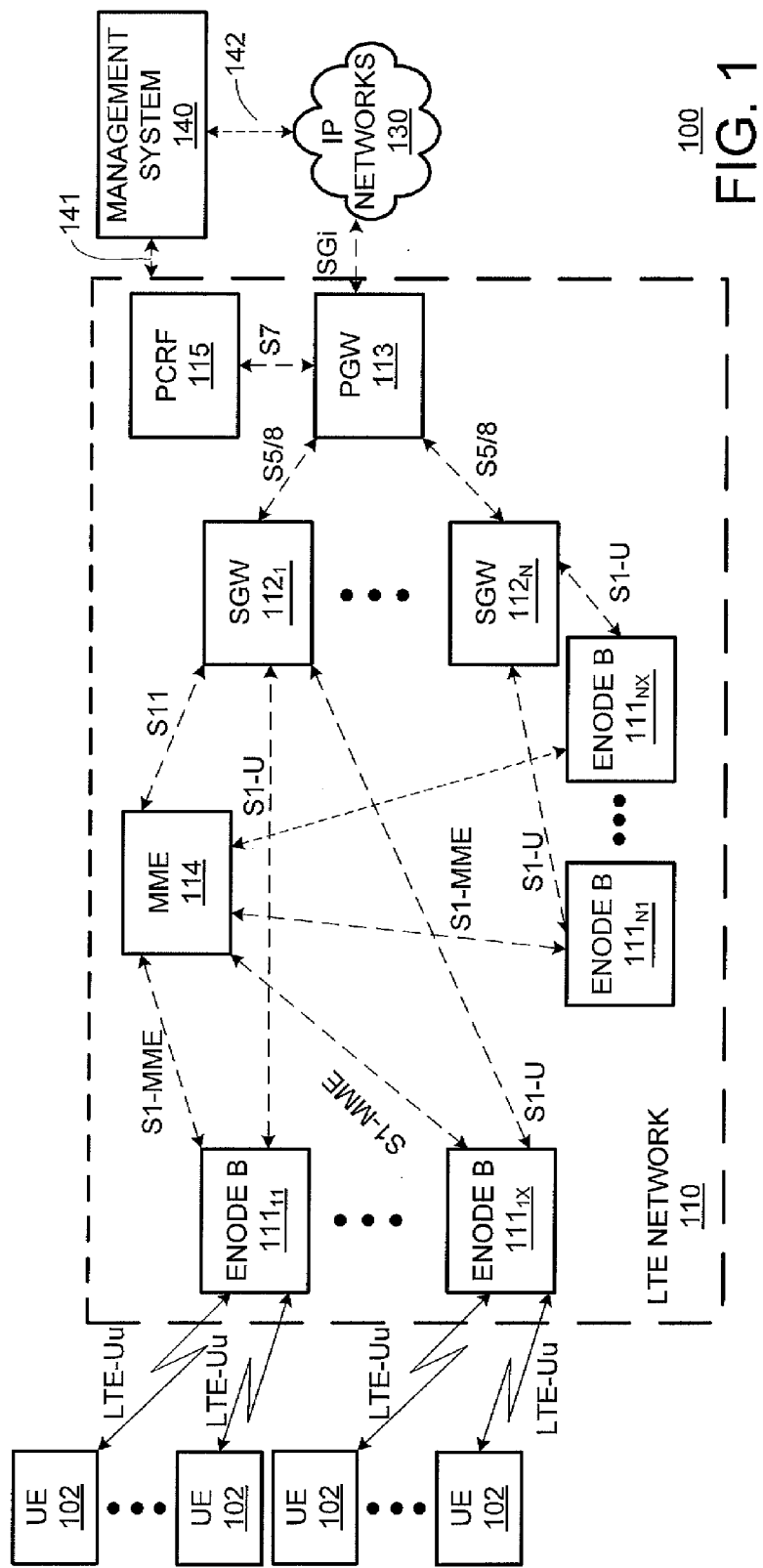
FIG. 1 depicts an exemplary communication system benefiting from an embodiment.

FIG. 1 depicts an exemplary wireless communication system including management and configuration functions according to an embodiment. Specifically, FIG. 1 depicts an exemplary wireless communication system 100 that includes a plurality of User Equipments (UEs) or User Devices (UDs) 102, a Long Term Evolution (LTE) network 110, IP networks 130, and a management system (MS) 140. The LTE network 110 supports communications between the UEs 102 and IP networks 130. The MS 140 is configured for supporting various management functions for LTE network 110. The configuration and operation of LTE networks will be understood by one skilled in the art.

The exemplary UEs 102 are wireless user devices capable of accessing a wireless network, such as LTE network 110. The UEs 102 are capable of supporting control signaling in support of the bearer session(s). The UEs 102 may be a phone, PDA, computer, or any other wireless user device.

The exemplary LTE network 110 includes a plurality of eNodeBs $111_{11}$ through $111_{NX}$ (collectively, eNodeBs 111), a plurality of Serving Gateway (SGWs) $112_1$ through $112_N$ (collectively SGWs 112), a Packet Data Network (PDN) Gateway (PGW) 113, at least one Mobility Management Entities (MME) 114, and a Policy and Charging Rules Function (PCRF) 115. The eNodeBs 111 provide a radio access interface for UEs 102. The SGWs 112, PGW 113, MME 114, and PCRF 115, as well as other components which have been omitted for purposes of clarity, cooperate to provide an Evolved Packet Core (EPC) network supporting end-to-end service delivery using IP.

The eNodeBs 111 support communications for UEs 102. As depicted in FIG. 1, each eNodeB 111 supports a respective plurality of UEs 102. The communication between the eNodeBs 111 and the UEs 102 is supported using LTE-Uu interfaces associated with each of the UEs 102.

The SGWs 112 supports communications for eNodeBs 111. The communication between the SGW 112 and the eNodeBs 111 is supported using respective S1-u interfaces. The S1-u interfaces support per-bearer user plane tunneling and inter-eNodeB path switching during handover. As depicted in FIG. 1, each SGW 112 supports a respective plurality of eNodeBs 111. In particular, a first SGW $112_1$ supports a first plurality of eNodeBs $111_{11}$ through $111_{1X}$, while an $N^{th}$ SGW $112_N$ supports an $N^{th}$ plurality of eNodeBs $111_{N1}$ through $111_{NX}$.

The PGW 113 supports communications for the SGW 112. The communication between PGW 113 and SGW 112 is supported using respective S5/S8 interfaces. The S5 interfaces provide functions such as user plane tunneling and tunnel management for communications between PGW 113 and SGW 112, SGW relocation due to UE mobility, and the like. The S8 interfaces, which may be Public Land Mobile Network (PLMN) variants of the S5 interfaces, provide inter-PLMN interfaces providing user and control plane connectivity between the SGW in the Visitor PLMN (VPLMN) and the PGW in the Home PLMN (HPLMN). The PGW 113 facilitates communications between LTE network 110 and IP networks 130 via a SGi interface.

The MME 114 provides mobility management functions in support of UEs 102. The MME 114 supports the eNodeBs 111. The communication between MME 114 and eNodeBs 111 is supported using respective S1-MME interfaces, which provide control plane protocols for communication between the MME 114 and the eNodeBs 111.

The PCRF 115 provides dynamic management capabilities by which the service provider may manage rules related to services provided via LTE network 110 and rules related to charging for services provided via LTE network 110.

As depicted in FIG. 1, elements of LTE network 110 communicate via interfaces between the elements. The interfaces described with respect to LTE network 110 also may be referred to as sessions.

The LTE network 110 includes an Evolved Packet System/Solution (EPS). In one embodiment, the EPS includes EPS nodes (e.g., eNodeBs 111, SGWs 112, PGW 113, MMEs 114, and PCRF 115) and EPS-related interconnectivity (e.g., the S* interfaces, the G* interfaces, and the like). The EPS-related interfaces may be referred to herein as EPS-related paths.

The IP networks 130 include one or more packet data networks via which UEs 102 may access content, services, and the like.

The MS 140 provides discovery and management functions for the various network elements forming the LTE network 110. The MS 140 may communicate with LTE network 110 in any suitable manner. In one embodiment, for example, MS 140 may communicate with LTE network 110 via a communication path 141 which does not traverse IP networks 130. In one embodiment, for example, MS 140 may communicate with LTE network 110 via a communication path 142 which is supported by IP networks 130. The communication paths 141 and 142 may be implemented using any suitable communications capabilities.

It is noted that the various switching, routing, communication and/or management elements or nodes discussed herein with respect to the various figures may be implemented in part using general purpose computing devices adapted to implement the respective control plane and data plane functions discussed herein. A general purpose computer suitable for use in implementing these control plane and data plane functions will be discussed in more detail below with respect to FIG. 3.

In a typical LTE system such as shown in FIG. 1 (slightly different configurations for other wireless systems), many mobile devices are in radio communication with various eNodeBs, which in turn may communicate via backhaul networks directly or through an intermediate router (not shown) with a service Gateway (SGW), which in turn communicates with a packet Gateway (PGW), which in turn communicates with various IP networks 130.

Each base station in a cellular network typically includes three antennas or radiators to support the wireless communication with the mobile devices within its respective sector, area or cell. These antenna provide coverage in a known manner. Each base station is associated with a unique identifier. A typical industry technique is to provide 504 unique cell identifiers within three groups of base stations forming a region. Since it is known to use both time division duplex (TDD) and frequency division duplex (FDD) at the various base stations, it may be necessary to use 6 identifiers for each base station.

Given a finite number of identifiers (e.g., 504), it is typically necessary to reuse identifiers. However, in doing so it is important to make sure that the identifiers are reused in a manner that avoids collisions (i.e., use of the same identifier for two adjoining cells) or confusion (use of the same identifier for a cell and the neighboring cell of an adjoining cell).

The various embodiments find particular utility within the context of temporary networks and the like. For example, a large trade show, exposition or other event will likely result in a dramatic increase in wireless usage due to attendees. Therefore, it is critically important to provide sufficient wireless infrastructure in and around the facility hosting the event such that the increased number of users in attendance at the event may communicate using voice, data, applications and the like. In setting up such a temporary network, it is preferable to avoid the lengthy calculations to locate base station sites or allow such sites to configure themselves in a hit or miss manner.

Figure 2:
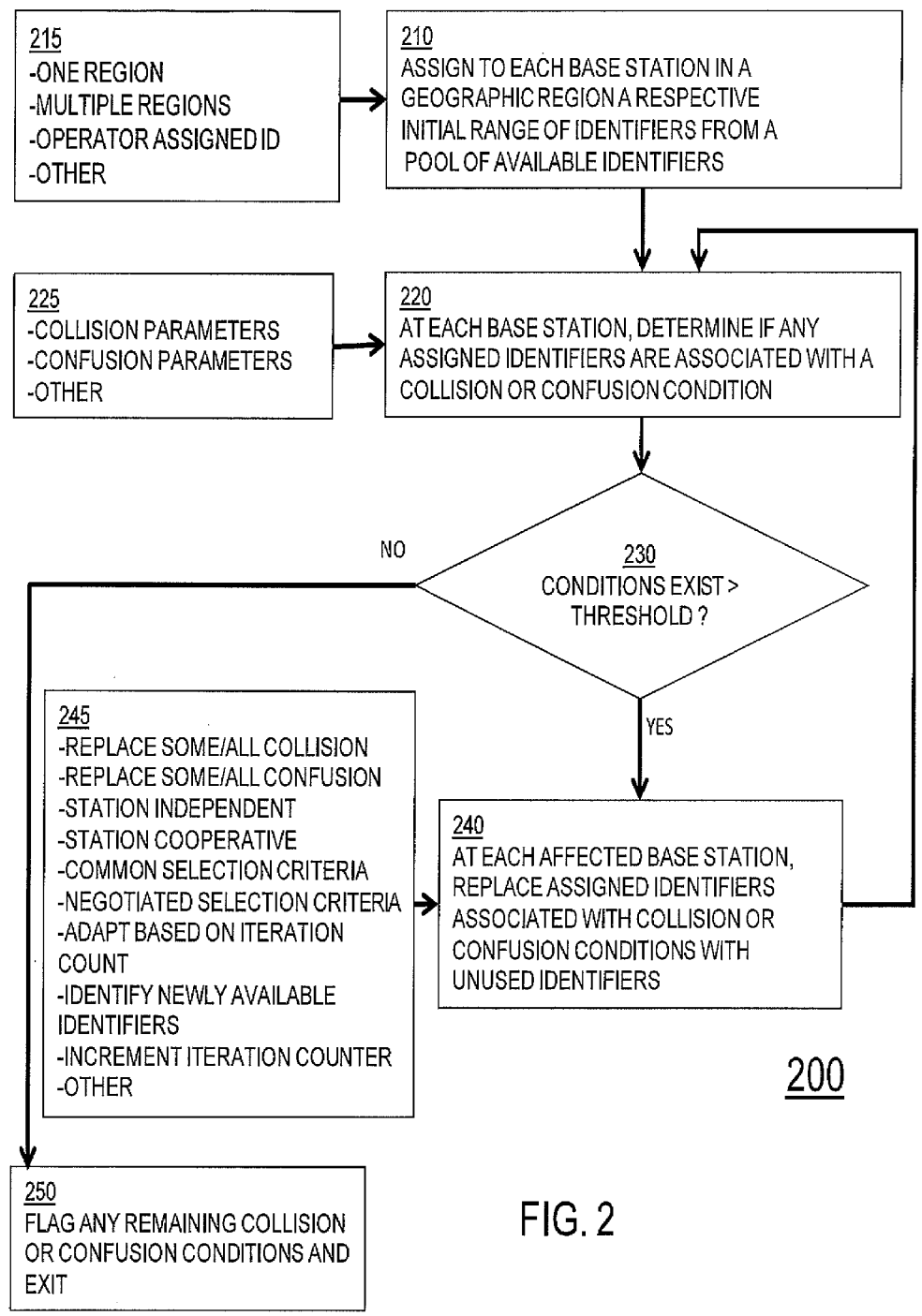
FIG. 2 depicts a flow diagram of a method according to one embodiment.

FIG. 2 depicts a flow diagram of a method according to one embodiment. Specifically, FIG. 2 depicts a method for allocating physical cell identifiers to a plurality of base stations, eNodeBs, cell regions or sector regions and so on, such as within the context of temporary or permanent wireless network. The method 200 of FIG. 2, as well as other methodologies and techniques discussed herein, may be fully driven and controlled by the operator, semiautonomous or fully autonomous (e.g., from the perspective of a base station or eNodeB).

At step 210, each base station in a geographic region is assigned a respective initial range of identifiers from a pool of available identifiers. That is, each base station is given a range of identifiers that it may use. This range is a subset of the available identifiers. The range of identifiers is given to each base station via the management system (MS). For example, a particular base station may be given identifiers 1-6, which means that the particular base station must respond to any mobile device seeking to communicate with a base station having any of identifiers 1-6.

In various embodiments, if the identifier of a particular base station has been assigned to that base station by its operator then the management system cannot change identifier, the problems associated with the identifier may be flagged so that the operator may make any changes that are appropriate.

In various embodiments, the assignment of identifiers to base stations is performed in a sequential manner starting with an initial base station and sequentially proceeding to base stations proximate that initial base station. In various embodiments, this determination may be made with respect to adjacency information and the like.

Referring to box 215, the geographic region may comprise a single region or multiple regions. Moreover, some base stations may be associated with an operator-assigned identifier which must not be changed. For example, if there is a collision or confusion between an operator-assigned identifier at a first base station and an identifier at a second base station, it is preferable for the identifier at the second base station to be changed. However, if the identifier at the second base station has already been provisioned (or reprovisioning would be unduly burdensome), then it may be appropriate to interact with the operator to request/suggest a new operator assigned identifier. Alternatively, the amount of power associated with one or both of the operator assigned identifier at the first base station and the identifier at the second base station may be reduced such that the collision or confusion condition is reduced or eliminated.

In some embodiments, individual regions are carved out of a total region and associated with respective sets of identifiers. The region-based ID allocation may be especially useful when organically growing a deployed network for example. In other variations, a large number of identifiers may be used. For example, existing LTE eNodeBs typically use a range of identifiers from 0 to 503 for a total of 504 unique identifiers. In various embodiments, the number of identifiers used within the context of an eNodeB is increased to more than the existing 504 unique identifiers. Similarly, the number of unique identifiers used in the stations of those wireless networks is increased in various embodiments.

At step 220, each base station determines if any assigned identifiers are associated with a collision or confusion condition. Referring to box 225, the collision and confusion conditions may be defined in terms of the "adjacency" associated with base station cellular regions having the same identifier. For example, a collision condition may be defined in terms of an adjacency of "1" in that two adjacent base stations (i.e., base stations supporting adjacent cellular regions) share one or more identifiers. Similarly, a confusion condition may be defined in terms of an adjacency of "2" in that two non-adjacent base stations (i.e., base stations supporting non-adjacent cellular regions) are adjacent to a common base station. Other adjacency levels may be used to define both collision conditions and confusion conditions. For example, in one embodiment, a collision condition is defined in terms of an adjacency of "1" or some other number, while a confusion condition is defined in terms of an adjacency of "3" or some other number.

At step 230, a query is made as to whether a number of existing collision conditions and/or confusion conditions exceeds a threshold amount. If the query is answered negatively, then at step 250 any remaining collision or confusion conditions are flagged for subsequent processing by the management system 140 and the method 200 is exited. If the query is answered positively, then the method 200 proceeds to step 240.

At step 240, each affected base station identifier associated with a collision and/or confusion conditions is replaced with an unused identifier. In one embodiment, each base station replaces any assigned identifier associated with a collision condition or a confusion condition with an unused identifier. In another embodiment, each base station interacts with one or more other base stations to determine which of the interacting base stations shall replace an identifier associated with a collision or confusion condition. After the base stations have replaced any assigned identifiers, the method 200 proceeds to step 220 to determine whether any of the newly assigned/replaced identifiers are associated with a collision or confusion condition; that is, steps 220-250 are repeated.

Referring to box 245, several mechanisms are discussed with respect to base station responses to the existence of a collision or confusion condition. These mechanisms may be used either singly or in any combination to determine the specific assigned identifiers in the specific base stations that will be replaced. In addition, each time the assigned base station identifiers are replaced, the prior identifier is now available for use by other base stations and identified to the network manager is available. Specifically, as the range of identifiers is exhausted, it is important to identify "holes" where allocated or assigned identifiers are simply not used by a particular base station. Each base station is tasked with informing the management system of any assigned identifiers that it is not using.

In some embodiments each base station replaces some or all of the identifiers associated with collision conditions (e.g., 100%, upper or lower 50%, upper or lower 25%, etc.), confusion conditions (e.g., 100%, upper or lower 50%, upper or lower 25%, etc.) or both conditions. In various embodiments, an upper portion or lower portion of identifiers replaced depends upon a specific code assigned to the base station by the network manager, an identifier of the base station itself (e.g., ending in an odd number, ending in an even number and so on) or some other parameter In some embodiments, each base station operates independently of the other base stations. That is, each base station replaces its respective assigned identifiers associated with collision or confusion conditions in a manner uncoordinated with other base stations.

In some embodiments, it is desirable to replace only a minimum number of identifiers necessary to avoid the collision/confusion conditions. For example, where collision exists between identifiers of two adjacent base stations, it is preferable to replace only one of the identifiers if that one replacement would be sufficient to remove the collision/confusion condition. Various embodiments provide mechanisms by which base stations may cooperate to achieve this goal.

In some embodiments, each of the various base stations uses a common selection criterion and/or criteria to determine which identifiers would be replaced. That is, assuming adjacent base stations associated with conflict identifiers, a common selection criteria is utilized so that only one of the base stations operates to replace its conflicting identifier.

In some embodiments, each of a plurality of base stations associated with mutually conflicting and/or confusing identifiers negotiates with each other to determine which one or more of the base stations will replace its identifiers. Such determination is made with respect to relative priority of base stations, relative traffic levels of base stations, a specific priority order defined by the operator and other criteria. This initial assigning is performed, in various embodiments, according to a specific sequence. The sequence may be defined using various criteria.

In some embodiments, the specific selection criteria is adapted depending upon the number of iterations for the method 200 of FIG. 2. In particular, the method 200 FIG. 2 operates to assign initial identifiers to each of a plurality of base stations.

In some embodiments, each base station cooperates with specific neighboring base stations, such as those base stations having an adjacency of, illustratively, 1 or 2. In these embodiments, cooperating base stations may negotiate with each other to prioritize the assignment of identifiers according to relative priority or importance levels, type of traffic levels and the like.

Generally speaking, the method 200 described above with respect to FIG. 2 allocates identifiers to base stations in either a dynamic manner or operator-driven manner. The method initially allows oversubscription of the cells in terms of the number of available identifiers, but allows individual base stations to identifier based upon some logic executed with respect to the base station. The method iterates through steps 220-250 until such time as the number of identifiers associated with collision or confusion conditions is less than a threshold number.

In various embodiments, the operation of steps 230-250 is adapted in response to the number of iterations of the steps that has occurred. For example, initial iterations through steps 220-240 may be used to preferentially replace assigned identifiers associated with collision conditions until such time as the number of collision conditions is less than a threshold number. At this time, subsequent iterations through steps 220 after 240 may be used to preferentially replace assigned identifiers associated with confusion conditions until such time as the number of confusion conditions is less than a threshold number. An iteration counter may be used to keep track of the specific iteration.

As the range of identifiers is exhausted, it is important to identify "holes" where allocated or assigned identifiers are simply not used by a particular base station. Each base station is tasked with informing the MS of any assigned identifiers that it is not using.

The method 200 of FIG. 2 adheres to various rules imposed by the management system, such rules being conveyed via policy update or other mechanism. The management system monitors this entire process and optionally guides individual base stations in the selection of unused identifiers and the like. In various embodiments, a management system keeps track of all the various iterations and updates its databases and data structures in response to determinations of operator assigned identifiers, necessary changes in assigned identifier ranges due to collision/confusion issues, "holes" or other identifiers released by base stations and so on.

In various embodiments, the management system updates its various databases in response to each base station identifier assignment. In various other embodiments, the management system updates its various databases only periodically, such as after each iteration through steps 220-240 or after some or all of the base station assignments are stabilized.

Thus, within the context of an LTE system, management system is aware of each eNodeB in the system and identifiers assigned thereto, the various neighbors associated with each eNodeB and identifiers assigned thereto, any holes or identifier availability and so on.

While primarily discussed herein within the context of a collision or confusion conditions associated with the addition of a new base station or eNodeB to an existing network, the various embodiments advantageously detect collisions or confusion that are not necessarily caused by the addition of a new eNodeB, new base station or new cells. For example, if an eNodeB or base station is removed from a network, the neighboring eNodeBs or base stations in the network might responsively augment their radio power levels such that the area served by the removed node continues to be served by the remaining nodes. In this case, a collision or confusion condition may arise due to the fact that the adjacency parameter associated with the remaining nodes has changed.

Thus, the embodiments discussed herein with respect to collision/confusion conditions associated with an addition of eNodeBs or base stations within a network are equally applicable to collision/confusion conditions associated with the removal of eNodeBs or base stations within a network. As such, various modifications to the discussed embodiments are also contemplated.

For example, in some embodiments a process of reallocating identifiers is initiated in response to one or both of adding a new base station to a network or removing an existing base station from the network. The initiated process may be limited in scope to one or more base stations proximate the newly added base station, one or more base stations within an adjacency of 1, and/or one or more base stations within an adjacency of 2 and so on.

In some embodiments, existing identifier allocations are stored in base station memory and/or management system memory such that they may be retrieved for subsequent use. For example, existing identifier allocations may be stored in memory by one or more base stations affected by an identifier reallocation process initiated in response to the removal of an existing base station from the network. When the removed base station is restored (added back) to the network, the stored identifier allocations may be retrieved from memory and used to rapidly reallocate identifiers within the affected base stations of the network.

Figure 3:
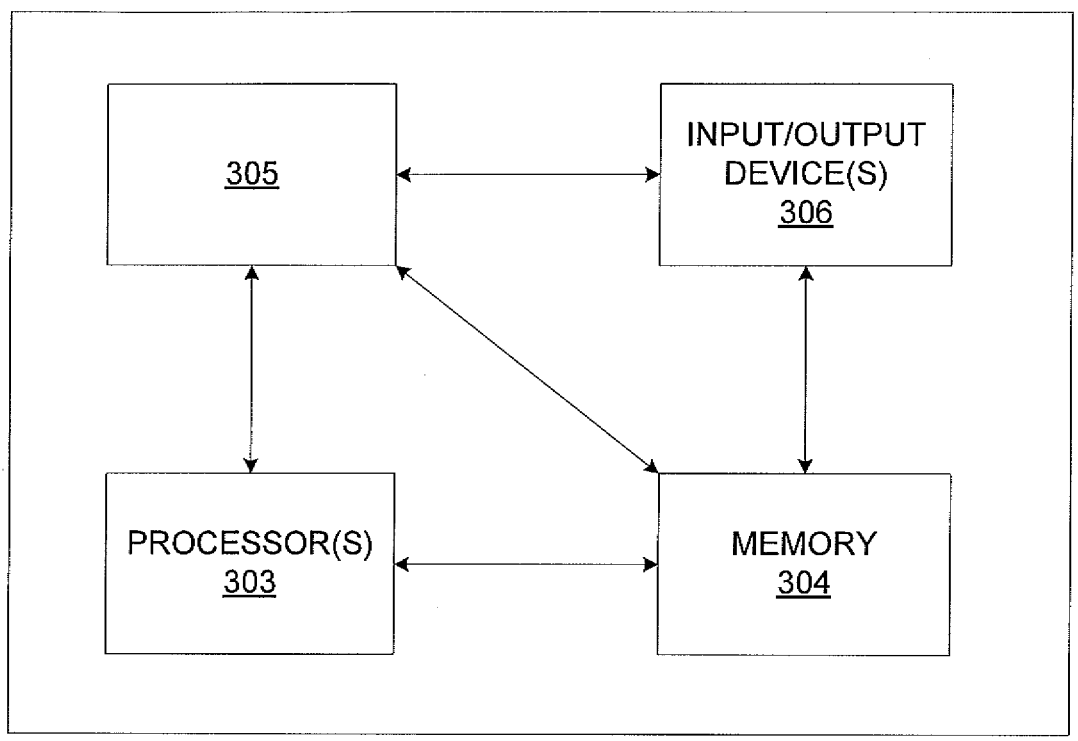
FIG. 3 depicts a high-level block diagram of a general purpose computer suitable for use in performing the functions described herein To facilitate understanding, identical reference numerals have been used, where possible, to designate identical elements that are common to the figures.

FIG. 3 depicts a high-level block diagram of a general purpose computer suitable for use in performing the functions described herein. In particular, the architecture and functionality discussed herein with respect to the general-purpose computer is adapted for use in each of the various switching and communication elements or nodes discussed herein with respect to the various figures; namely, the UEs 102, eNodeBs 111, SGWs 112, PGW 113, MMEs 114, PCRF 115, and management system 140. It will be appreciated that some of the functionality discussed herein with respect to described general purpose computer may be implemented in various network elements or nodes, and/or a network operations center (NOC) or management system (MS) operative to configure and manage elements within the network.

As depicted in FIG. 3, system 300 comprises a processor element 302 (e.g., a CPU), a memory 304, e.g., random access memory (RAM) and/or read only memory (ROM), a packet processing module 305, and various input/output devices 306 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It will be appreciated that computer 300 depicted in FIG. 3 provides a general architecture and functionality suitable for implementing functional elements described herein and/or portions of functional elements described herein. Functions depicted and described herein may be implemented in software and/or hardware, e.g., using a general purpose computer, one or more application specific integrated circuits (ASIC), and/or any other hardware equivalents.

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal bearing medium, transmitted via tangible media and/or stored within a memory within a computing device operating according to the instructions.

Referring again to the tradeshow example, small or micro base stations may be set up anywhere in, on or around the facility hosting the tradeshow without regard to the resulting base station adjacencies. Various algorithms according to one or more embodiments are executed by the management system in conjunction with the base stations to assign thereby the various identifiers, resolve collision and confusion situations and so on. Additionally, various modifications may be made to base station power level or other parameters to define thereby specific adjacencies and/or overlaps among the various cellular regions.

In addition, within the context of a 3G to 4G transition, deployed 4G base stations may be operated at maximum power levels due to their relative scarcity, which power levels may be scaled back as increasing numbers of 4G base stations are deployed. The various embodiments discussed herein allow for automatic re-provisioning of the 4G base stations in response to collision/confusion situations.

All of the information is reported back to the management system, which depends upon the nodes to inform it of any developing problems and to, in various embodiments, provide partial solution information.

The various embodiments described above advantageously automate a manual process while improving upon the accuracy and quality of the ultimate identifier assignment solutions, thereby extracting as much performance as possible out of the network infrastructure. Moreover, various embodiments provide a reporting capability adapted to inform service providers of the identifier assignments and related performance information associated with each of the base stations.

While the foregoing is directed to various embodiments of the present invention, other and further embodiments of the invention may be devised without departing from the basic scope thereof. As such, the appropriate scope of the invention is to be determined according to the claims, which follow.

What is claimed is:

1. A method for allocating a finite number of identifiers to a plurality of base stations in a wireless network performed by a computing device comprising a processor and a memory, the method comprising:

assigning, by said computing device, to each base station, a respective initial range of identifiers from said finite number of identifiers; and until a number of assigned identifiers associated with either of a collision condition or a confusion condition is below a threshold level, iteratively performing the steps of:

(a) replacing at least some assigned identifiers associated with either of said collision or confusion conditions with unused identifiers, each replaced identifier being added to a pool of unused identifiers; and (b) determining, for each assigned identifier at each base station, whether the assigned identifier is associated with either of said collision condition or confusion condition.

2. The method of claim 1, wherein said assigning initial ranges of identifiers is performed by a management system (MS) in communication with the base stations.

3. The method of claim 1, wherein said iteratively performed steps are performed at each base station.

4. The method of claim 1, wherein adjacent base stations associated with mutually conflicting identifiers operate independently to determine which conflicting or confusing identifiers are to be replaced.

5. The method of claim 4, wherein each base station determines which conflicting or confusing identifiers are to be replaced according to a common selection criterion.

6. The method of claim 5, wherein said common selection criterion is adapted to cause replacement of a minimum number of identifiers sufficient to avoid either or both of the collision condition and the confusion condition.

7. The method of claim 1, wherein adjacent base stations associated with mutually conflicting identifiers cooperate with each other to determine which one or more identifiers are to be replaced.

8. The method of claim 7, wherein each base station determines which conflicting or confusing identifiers are to be replaced according to a common selection criterion.

9. The method of claim 8, wherein said common selection criterion is adapted to cause replacement of a minimum number of identifiers sufficient to avoid either or both of the collision condition and the confusion condition.

10. The method of claim 1, wherein adjacent base stations negotiate with each other to determine one or more identifiers to be replaced.

11. The method of claim 5, wherein said common selection criterion is adapted depending upon a number of iterations of steps (a) and (b).

12. The method of claim 8, wherein said selection criterion is adapted depending upon a number of iterations of steps (a) and (b).

13. The method of claim 1, wherein said plurality of base stations in said wireless network comprise a plurality of base stations in a single geographic region.

14. The method of claim 1, wherein said plurality of base stations in said wireless network comprise a plurality of base stations distributed across two or more geographic regions.

15. The method of claim 1, further comprising reallocating identifiers associated with base stations proximate a newly added base station.

16. The method of claim 1, further comprising reallocating identifiers associated with base stations proximate a newly removed base station.

17. The method of claim 16, further comprising restoring identifiers previously associated with base stations proximate a removed base station in response to the restoration of the removed base station.

18. An apparatus for allocating a finite number of identifiers to a plurality of base stations in a wireless network, comprising:

a processor configured for:

assigning, to each base station, a respective initial range of identifiers from said finite number of identifiers; and until a number of assigned identifiers associated with either of a collision condition or a confusion condition is below a threshold level, iteratively performing the steps of:

(a) replacing at least some assigned identifiers associated with either of said collision or confusion conditions with unused identifiers, each replaced identifier being added to a pool of unused identifiers; and (b) determining, for each assigned identifier at each base station, whether the assigned identifier is associated with either of said collision condition or confusion condition.

19. A non-transitory computer readable medium including software instructions which, when executed by a processor, performs a method for allocating a finite number of identifiers to a plurality of base stations in a wireless network, comprising:

assigning, to each base station, a respective initial range of identifiers from said finite number of identifiers; and until a number of assigned identifiers associated with either of a collision condition or a confusion condition is below a threshold level, iteratively performing the steps of:

(a) replacing at least some assigned identifiers associated with either of said collision or confusion conditions with unused identifiers, each replaced identifier being added to a pool of unused identifiers; and (b) determining, for each assigned identifier at each base station, whether the assigned identifier is associated with either of said collision condition or confusion condition.

20. A computer program product, wherein a computer is operative to process software instructions which adapt the operation of the computer such that the computer performs a method for allocating a finite number of identifiers to a plurality of base stations in a wireless network, comprising:

assigning, to each base station, a respective initial range of identifiers from said finite number of identifiers; and until a number of assigned identifiers associated with either of a collision condition or a confusion condition is below a threshold level, iteratively performing the steps of:

(a) replacing at least some assigned identifiers associated with either of said collision or confusion conditions with unused identifiers, each replaced identifier being added to a pool of unused identifiers; and (b) determining, for each assigned identifier at each base station, whether the assigned identifier is associated with either of said collision condition or confusion condition.

21. A method for allocating cell identifiers in a wireless network performed by a computing device comprising a processor and a memory, the method comprising:

sequentially assigning, by said computing device, to each of a plurality of base stations in a geographic region, a respective portion of a range of available identifiers;

sequentially assigning, to those base stations having one or more assigned identifiers associated with a collision or confusion condition, one or more corresponding replacement identifiers until a number of base stations having assigned identifiers associated with a collision or confusion condition is below a threshold level, wherein each replaced identifier is added to a pool of unused identifiers.

22. The method of claim 21, wherein a sequential order of base stations is randomly determined from within the plurality of base stations in the geographic region.

* * * * *